Oct. 3, 1961  W. C. WILKINSON  3,003,084
ELECTRICAL DISTRIBUTION SYSTEM
Filed July 16, 1956  4 Sheets-Sheet 1
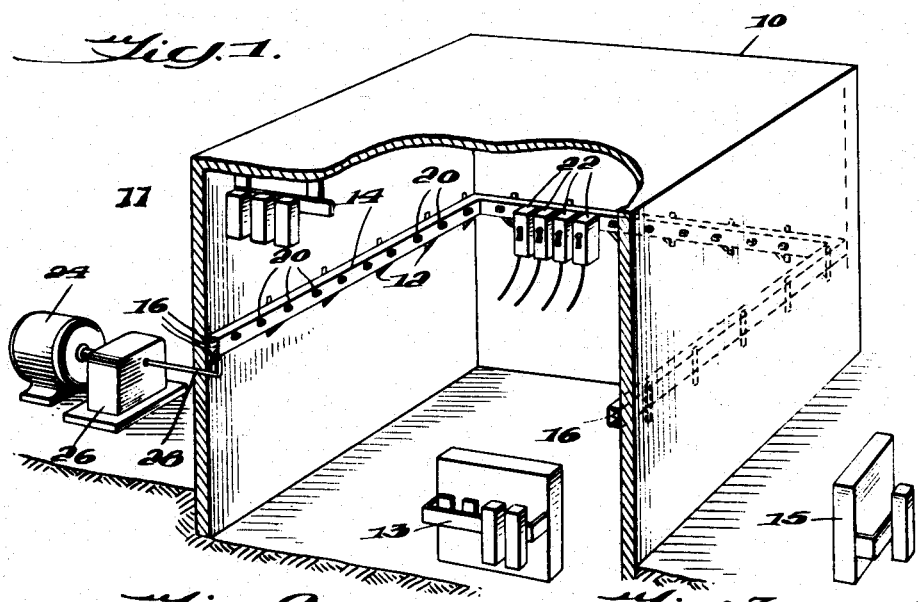
INVENTOR
WELDON C. WILKINSON,
BY William G. Honold
ATTORNEY

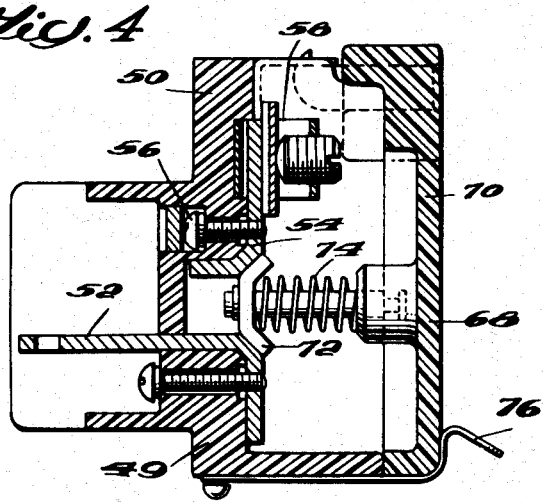
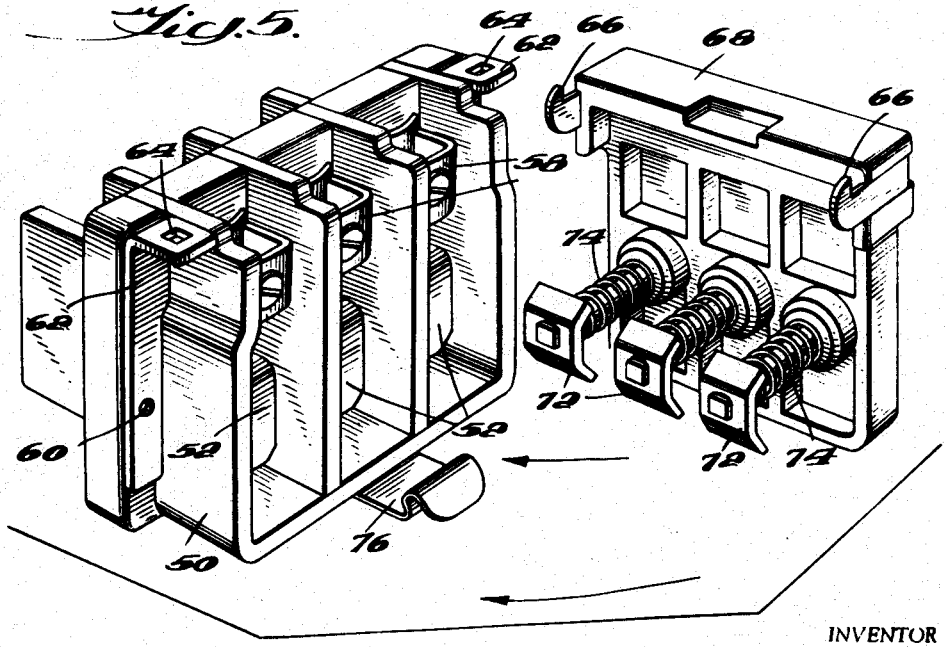

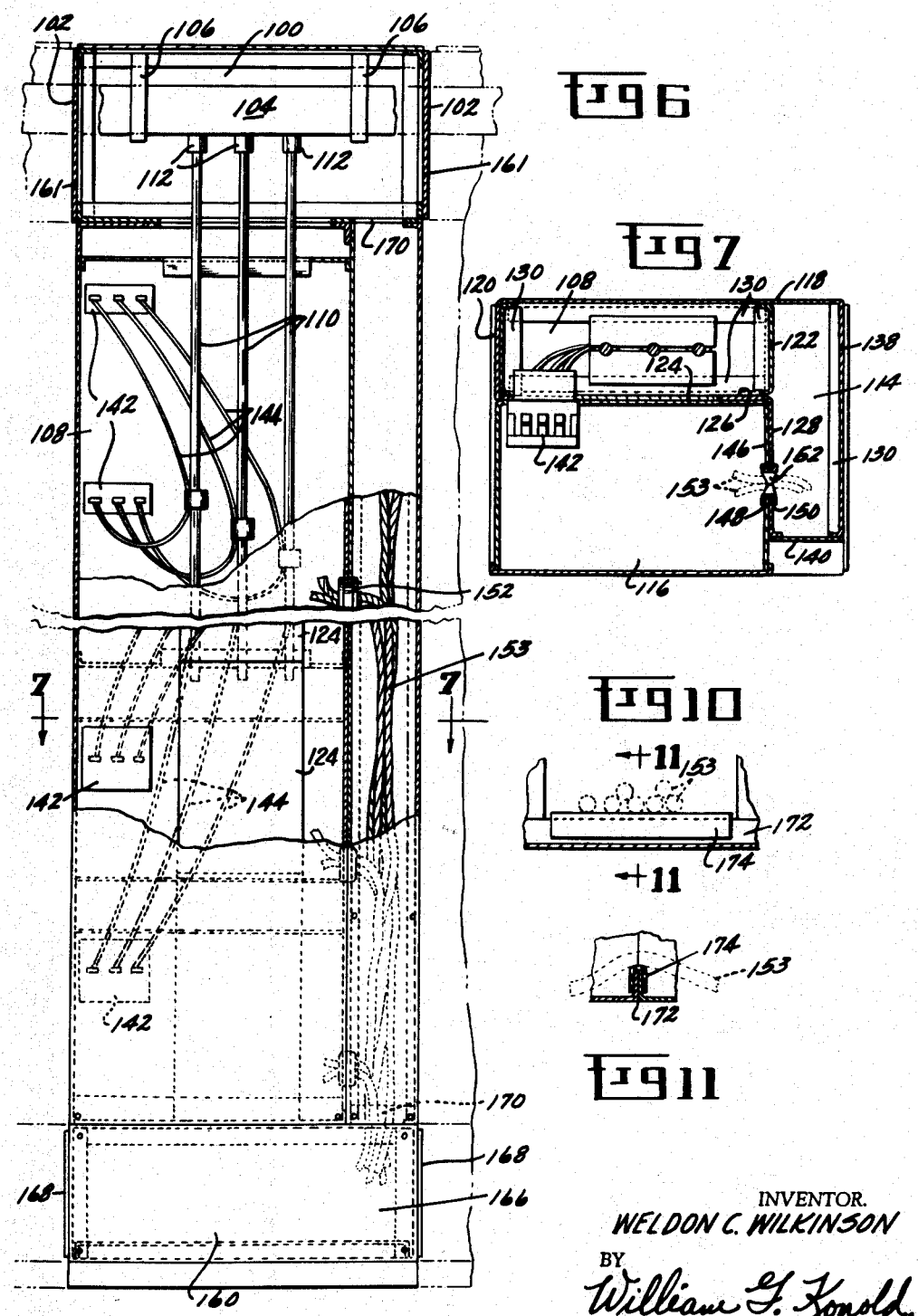

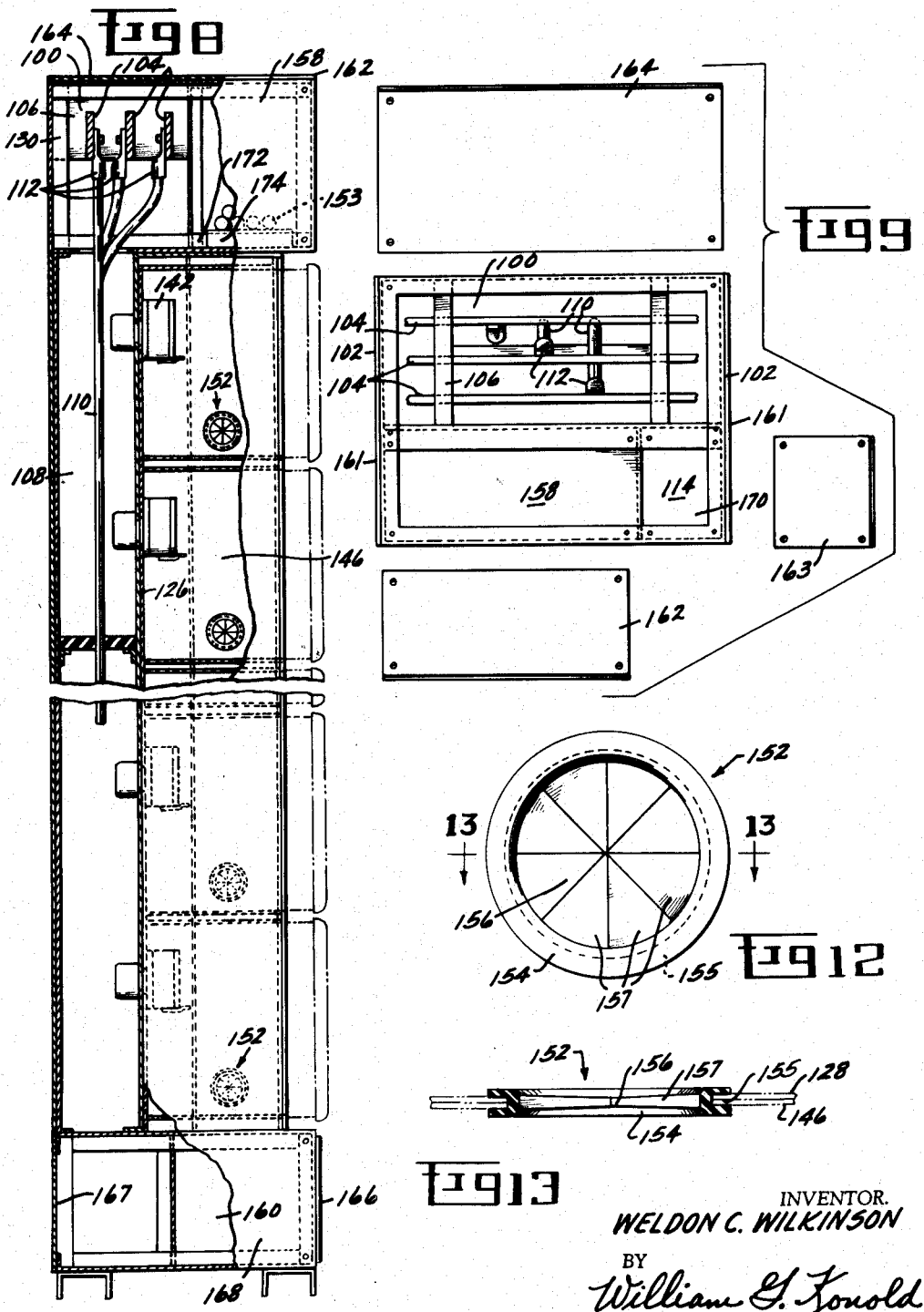

United States Patent Office 3,003,084
Patented Oct. 3, 1961

3,003,084
ELECTRICAL DISTRIBUTION SYSTEM
Weldon C. Wilkinson, Baltimore, Md., assignor to Rowan Controller Company, Baltimore, Md., a corporation of Maryland
Filed July 16, 1958, Ser. No. 749,580
5 Claims. (Cl. 317—99)

This invention relates to an electrical distribution system, and more particularly, the invention relates to an electrical distribution system for factories and the like requiring a number of outlets for supplying current to a large number of motor installations and the like.

In accordance with the present practice, plants having need for operating a number of heavy motors substantially independently, will locate such motors at their proper positions and run heavy cable to a central power supply. Associated with the central power supply are known control devices for selectively operating the motors as desired. Such installations have the principal disadvantage that for each motor or the like the heavy cable which carries the current to the motor must be installed from the control center to the motor in accordance with the existing electrical codes. Not only does the original installation require a complex system of cables all over the plant, but to rearrange machinery for changing the original installation to a different type of operation, requires the destruction of the existing system and re-installation of a completely new system.

It is the object of the present invention to eliminate the disadvantages of the present practice with its central control and supply system. The principal disadvantages are eliminated and the object attained by providing a main bus mounted all around the walls of the plant and enclosed in a bus duct. Spaced along the bus duct (approximately 14 inches on center, for example) are outlets preferably consisting of line terminal blocks. These terminal blocks are permanently mounted on the bus duct and, when not in use, are encased or covered so as to leave no exposed live contacts. Each of the terminal blocks, however, is permanently electrically connected to the bus or cable so that by pulling off the cover of the terminal block or outlet, the hot contacts are exposed.

It is to be understood that when the term "bus" is used, reference is made to non-insulated conductors or insulated cable.

The principal advantage of the arrangement according to the invention is that outlets for all electrical installations are readily available after the original installation of the bus duct and outlet system. Thus, either the installation of new equipment or the subsequent rearrangement of existing equipment also can be easily accomplished.

Further, the system in accordance with the present invention permits a pressurizing of the current carrying and switching components in hazardous areas. In accordance with present practice, such hazardous areas are maintained completely under pressure so that the whole room is being continuously exhausted in order to avoid the ignition of combustible gases by arcs drawn by the switching components. In accordance with the present invention, the bus duct and switching assembly is connected to a supply of gas under pressure so that the pressure in the system is greater than atmospheric. Thus, it is impossible for any combustible gases to get into the switching mechanism where an arc is liable to cause an explosion.

Another object of the invention is to mount the switching mechanism, which would consist of a disconnecting switch or circuit breaker, a magnetically operated contactor, and possibly an overcurrent relay, or any combination of such units, on the bus duct with an interlock arrangement by which the switching mechanism could not be dismounted without disconnecting the main switch or circuit breaker. This is not only a valuable safety feature from the standpoint of the electrical hazard, but it insures that there will be no arcing such as might ignite combustible gases when the assembly is being dismounted.

Another object of the invention is to provide a bus duct and outlet system as described with a housing for electrical components extending down from the duct, and a cable tray mounted behind the housing and spaced below the duct.

In an alternative form of the invention, instead of hanging combination starters from a horizontally disposed bus duct, vertical bus drops connected to the main horizontal bus are encased in vertical ducts and are spaced along the horizontal duct. Adjoining each vertical duct but physically isolated therefrom is a cable duct through which are passed the cables to the motors or the like energized by the system. The combination starter housings are mounted adjacent the vertical bus duct and the vertical cable duct and are physically isolated from each. A plurality of such housings may be horizontally disposed and spaced vertically along the vertical ducts.

The alternative arrangement not only provides the isolation feature which serves to localize damage by fire, but also provides economy of space and convenience of use and installation. Typical of the damage the invention avoids is the flash occurring upon failure of a unit. In the absence of the invention, this flash would carbonize the surrounding electrical equipment and cause a costly shutdown. Still further, the isolation of the various units, cable and bus ducts localizes heat dissipation thereby avoiding the "chimney effect" of prior constructions. The chimney effect resulted from the units dissipating heat into a common duct which duct would concentrate heat at the area of the bus and create a high ambient temperature at that location. The high ambient temperature in turn requires the use of bus having a higher rating than would be required if ambient were room temperature.

It is another object of the invention to provide a grommet for connecting adjacent compartments, such as control unit housing and cable duct, in which the grommet has a web formed of separate sectors which snugly embrace cable passing therethrough, thus completing the isolation of adjacent compartments.

It is still another object of the invention to provide a U-shaped bridge joining adjacent transverse flanges of cable duct sections to protect the cable insulation against wearing on the flange edges.

These and other objects of the invention will become more readily apparent from the following detailed description of the invention taken in conjunction with the accompanying drawings in which:

FIG. 1 is a perspective diagrammatic view showing a plant installation;

FIG. 2 is an elevational view partly in section of the bus duct and starter combination;

FIG. 3 is a front elevational view of the bus duct and starter combination of FIG. 2;

FIG. 4 is a cross sectional view of the terminal block and safety disconnect jack to be used in the assembly;

FIG. 5 is an exploded perspective view of the terminal block and safety disconnect jack;

FIG. 6 is a front elevational view, partly in section of an alternative form of the invention;

FIG. 7 is a cross sectional view taken along lines 7—7 of FIG. 6;

FIG. 8 is a side elevational view, partly in section of the alternative form;

FIG. 9 is an exploded view of the top of the invention;

FIG. 10 is a fragmentary view of a connection between adjacent duct sections;

FIG. 11 is a cross sectional view taken along lines 11—11 of FIG. 10;

FIG. 12 is a plan view of a grommet, and

FIG. 13 is a cross sectional view taken along lines 13—13 of FIG. 12.

Referring to FIG. 1, three walls of a room of a plant are indicated at 10. Mounted by means of brackets 12 is an elongated bus duct 14 extending around the periphery of the plant. It is to be understood that the bus duct could cross the plant intermediate the walls or could be mounted to the ceiling as shown at 11 if advisable. Other arrangements such as self contained, insulated stations 13 comprising racks supporting ducts with varying numbers of outlets could be used depending on the particular plant arrangement. Further, it is within the scope of the invention to make installations outside the plant building as shown at 15.

Inside the bus duct are buses or cables 16 which are mounted in suitable supports 18 (FIG. 2) of insulating material in a known manner. Substantially uniformly spaced around the room on the bus duct are outlets 20, to be described in detail below.

An assembly of housings 22 for electrical components is shown on one of the bus duct sections, by way of example. Each of the housings 22 is associated with an outlet.

Associated with the duct and housing assembly is a motor 24 and a gas supply or compressor 26 arrangement feeding through tube 28 into the bus duct. The compressor maintains the bus duct at a pressure considerably above atmospheric in order to prevent any gases in the room from entering into the housing 22 containing electrical components where an arc might cause an explosion.

Each outlet 20 is connected by suitable conductors 30 to the buses 16 in a relatively permanent manner. The bus duct and outlet assembly is in this state of electrical connection at the time of the completion of the original installation.

If it is desired to connect motors, for example, to the bus, the housing 22 contains a combination starter for each motor and is mounted to the bus duct principally by means of the angle member 34 and support member 35 which terminates in the inverted U-shaped portion 37. The portion 37 extends along the top of housing 22 and prevents dust from passing between members 34 and 35 into the back of housing 22. An additional point of connection is by means of metal screws or bolts 36 which are accessible from the inside of the housing 32. The screw 36 cooperates with a switch interlock which insures that the housing 22 be removed only when the main switch is in "off" position as described below.

Small holes 38 and 40 in the duct and housing 22, respectively, are aligned to permit gas under pressure from compressor 26 to fill the combination starter. The holes in the bus duct are normally plugged when there is no attached combination starter. Mounted behind housing 22 and spaced below duct 14 is a tray 39 for receiving cable 41 leading from the components in the housing to the electrical equipment such as motors to be operated.

Each combination starter will comprise known elements and including a main disconnecting switch or circuit breaker, a magnetically operated contactor and possibly an overload relay or combination of one or more of such components. These known elements are not shown in detail but are indicated generally at 42. Engaging the disconnecting switch or circuit breaker is an interlock indicated diagrammatically at 44 associated with a handle 45 which is operable upon opening of an access door 46 to the housing 32. Upon opening of access door 46, the interlock system indicated at 44 will open the disconnecting switch or circuit breaker thereby rendering the combination starter inoperative.

The combination starter components are electrically connected to the outlet by conductors 48.

The outlet consists of a terminal block 49 having a support of insulating material 50 onto which is mounted a feeder or bus contact 52 which is normally permanently connected to the bus by conductors 30 (FIG. 2). Starter contacts 54 are mounted by bolts 56 to the support 50 spaced from the feeder contacts 52. A suitable connector 58 is associated with each starter contact 54 for the purpose of connecting conductors 48 (FIG. 2) to the terminal block. The terminal block is provided with holes 60 at either side of the block to permit its being mounted to the bus duct. Also, at either side of the terminal block are hinge supports 62 having holes 64 to receive hinges 66 on a safety disconnect jack 68.

The disconnect jacks consists of a support or cover 70 of insulating material having perpendicularly mounted posts on which are slidably mounted bridging contacts 72. The bridging contacts are biased toward the terminal block by compression springs 74.

When assembled, the hinges 66 hook into the holes 64 in hinge supports 62 and a spring steel snap 76 holds the cover closed on the terminal block with the bridging contacts 72 in firm engagement with the contacts 52 and 54.

When the disconnect jack of the type shown in FIGS. 4 and 5 is mounted in engagement with the terminal block to bridge the contacts 52 and 54, the connectors 58 are "hot" or connected through bridges 72 to the bus bars in the ducts. This is an undesirable condition unless there is equipment attached for operation. Consequently, for terminal blocks which are not in use, the cover 70 will be provided with insulated blanks in place of the bridging contacts 72. Thus, the connectors 58 will normally remain insulated from the hot contacts 52.

In summary of the application of the invention, a building preferably would be provided at its original installation with a complete bus duct 14 containing buses 16. Spaced around the bus duct will be outlets 20, each consisting of the terminal block and disconnect jack. Normally, the safety disconnect jack will be provided with blanks of insulating material instead of the bridging contacts 72.

Optional equipment for use in areas where hazardous combustible gas is present is the motor and compressor unit which maintains the bus duct constantly under pressure greater than atmospheric.

Any time the installation of motors or the like is desired, the combination starters 22, for example, are mounted on the bus duct, each one enclosing a safety jack. The combination starter is mounted in such a way that it can only be dismounted when the access door 46 is open, thereby operating the interlock which disconnects the main switch in the combination starter. Thus, while the combination starter is normally under pressure greater than atmospheric provided through holes 38 and 40 in the duct and combination starter housing, when the door is opened to dismount the starter and the high pressure no longer obtains, no undesirable arcing can occur in view of the fact that the interlock has disconnected the equipment from the line. Additionally, the hazard arising from hazardous atmosphere being ignited by an arcing electrical contact is virtually eliminated.

An alternative form of the invention is shown in FIGS. 6, 7, and 8. In the forms of the invention described heretofore, the line safety jacks and the associated combination starters have been spaced horizontally along a horizontal bus duct. By utilizing the alternative form of the invention shown in FIGS. 6 to 8, the economy of space and convenience in use can be effected.

Broadly, the alternative form consists in providing a secondary bus duct which receives vertically disposed secondary or drop bus depending from the main horizontally extending bus. A plurality of combination starters are vertically mounted on the secondary bus duct and connected to associated line safety jacks. A vertically disposed cable duct is mounted adjacent the secondary bus duct and is integral therewith to receive cable extending from the combination starter to the motors or the like controlled by the combination starter. The secondary bus duct and the adjacent cable duct forms an L-shaped nest to which each combination starter is mounted. As will be seen from the detailed description below, the distinct components of the system are, insofar as possible, physically isolated from each other, communication being provided only for the passage of cable and the like. The isolation of secondary duct, cable duct and combination starter all from one another operates to localize any damage which might occur from a fire or the like in one of the components.

Turning to the drawings specifically, the vertical unit of the invention is suspended from a section 100 of the horizontal bus duct having openings at either end 102 for the passage of bus 104. The bus is mounted in brackets 106 as described in the embodiments above.

Extending downwardly from the horizontal duct section 100 is a vertical duct 108 within which are supported secondary or drop bus 110 connected to the main bus 104 by solderless connectors 112 bolted or otherwise secured to the main bus 104.

A vertically extending cable duct 114 is mounted adjacent the secondary duct 108 and forms with it an L-shaped structure which receives a plurality of control unit housings 116 in nesting relationship.

In the embodiment illustrated, the secondary duct 108 and the cable duct 114 are formed in part by a generally channel-shaped sheet metal member 118 (FIG. 7). The secondary duct is closed by a leg 120 of member 118 and a side plate 122, a plurality of panels 124, and an L-shaped member 126 which has a leg 128 forming a part of the cable duct 114. The ducts 108 and 114 are braced transversely by spaced angle members 130. The panels 124 are removably attached to the angle members 130 by screws, bolts or other suitable means.

The cable duct 114 is formed along one side by the plate 122 and the leg 120 of L-shaped member 126. The back and outer side of the secondary duct is formed by a leg 138 of the member 118. The front of the cable duct is closed by a removable front plate 140.

Vertically spaced line safety jacks 142 of the type shown in FIGS. 4 and 5 are fixed in the panels 124 forming a part of the front of the secondary bus duct 108. The line safety jacks are connected to a drop bus 110 by leads 144.

Depending upon the number of motors or the like to be operated from the bus drop 110, a predetermined number of control units such as combination starters are employed, each being disposed in its enclosure or housing 116, the enclosures being nested adjacent the secondary bus duct and the cable duct.

No access to the bus drop is necessary through the starter enclosure because of the line safety jack and accordingly, substantially complete physical isolation of duct and starter is provided. The starter housing 116 is formed with a hole which will receive the line safety jack 142 as it extends into the interior of the combination starter housing 116, the line safety jack thereby sealing the hole. A side wall 146 of the combination starter housing 116 adjacent the cable duct 114 has an opening 148 matching a hole 150 in the leg 128, a grommet 152 surrounding the holes to permit the passage of cable indicated at 153.

The grommet 152 of the present invention is illustrated in FIGS. 12 and 13, and comprises an outer ring 154 forming an annular channel 155 and a web 156 consisting of a plurality of separate sectors 157. Each sector is tapered toward its apex as best illustrated in FIG. 13. The thicker portion of each sector urges the sector into the position of FIG. 13, thereby causing the cable passing through to tend to center itself whereas the thinner end portion permits each sector tends to follow the contours of the cable passing therethrough in order to maintain, as completely as possible the isolation of the enclosure 116 and the duct 114 from each other.

Inspection of FIG. 7 particularly will demonstrate the isolation feature of the invention. Secondary bus duct 108 is completely isolated from both the combination starter 116 through the use of the line safety jack 142 and the cable duct 114.

Each combination starter is completely isolated from the cable duct 114 except for such minute openings as may be left between the cable and grommet sectors 157.

FIG. 8 shows additional cable duct sections 158 at the top of the secondary bus duct and adjacent the main bus duct 100; and 160 and at the bottom of the secondary bus duct. The duct section 158 has removable end covers 161 and three removable top plates 162, 163 and 164. (FIG. 9). The removable plate 163 permits the attachment of a vertical duct to the top of the structure for the passage of cable or control conductors without disturbing the top cover to the horizontal duct section 158 or to the horizontal bus duct section 100.

The duct section 160 has a removable front cover 166, a removable back cover 167 and removable end covers 168. Cable from each of the combination starters passing through the cable duct 114 will pass through the duct sections 158 or 160, the passage of the cable being permitted by the removable end covers. The removable back cover 167 permits the passage of cables to adjacent units when mounted back to back. Holes 170 are formed in the top and bottom of cable duct 114 to permit the passage of the cable into the top and bottom sections.

The duct sections, for example 158, are terminated at their open ends by vertical flanges 172 (FIGS. 8, 10 and 11) and when joined together present two upwardly directed edges, as shown in FIG. 11, across which cable 153 must pass. To eliminate the wear on the cables arising from the rough or sharp edges on flanges 172, a U-shaped elongated bridge 174 of plastic rubber or metal is mounted on the flanges.

It will be noted that the alternative form of the invention is designed to permit a plurality of units to be mounted side by side, all being connected to a horizontal bus and duct system as shown in FIG. 1.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. An electrical distribution system comprising a horizontally extending bus duct having an opening only in the bottom thereof, at least one primary bus located in said duct, a vertically extending bus duct having closed vertical walls and an opening at the top thereof, said vertical duct being joined to said horizontal duct with said openings aligned, at least one secondary bus dropping from said primary bus and disposed in said vertical duct, a plurality of closed control unit housings secured in vertical alignment to a wall of said vertical duct, control units in said housings, an electrical connector unit mounted in the adjoining walls of each said housing and said vertical duct to provide electrical communication between said secondary bus and said control units, a vertical cable duct having closed vertical walls and openings at the top and bottom thereof, one of the walls of said cable duct adjoining a wall of each said housing, the adjoining walls of said cable duct and housings having small aligned openings for the passage of cable between each said housing and cable duct, means for sealing said openings around said cable, and horizontal cable ducts at the top and bottom of said cable duct and having openings communicating with said cable duct, said horizontal ducts including walls forming barriers to isolate said horizontal ducts from said bus ducts and from said control unit housings.

2. An electrical distribution system comprising a horizontally extending bus duct having an opening only in the bottom thereof, at least one primary bus located in said duct, a vertically extending bus duct having closed vertical walls and an opening at the top thereof, said vertical duct being joined to said horizontal duct with said openings aligned, at least one veritcal bus dropping from said primary bus and disposed in said secondary duct, a plurality of closed control unit housings secured in vertical alignment to a wall of said vertical duct, control units in said housings, an electrical connector unit mounted in the adjoining walls of each said housing and said vertical duct to provide electrical communication between said secondary bus and said control units, a vertical cable duct having closed vertical walls, one of the walls of said cable duct adjoining a wall of each said housing, the adjoining walls of said cable duct and housings having small aligned openings for the passage of cable between each said housing and cable duct, and means for sealing said openings around said cable.

3. An electrical distribution system comprising a horizontally extending bus duct having an opening only in the bottom thereof, at least one primary bus located in said duct, a vertically extending bus duct having closed vertical walls and an opening at the top thereof, said vertical duct being joined to said horizontal duct with said openings aligned, at least one secondary bus dropping from said primary bus and disposed in said vertical duct, a plurality of closed control unit housings secured in vertical alignment to a wall of said vertical duct, control units in said housings, an electrical connector unit mounted in the adjoining walls of each said housing and said vertical duct to provide electrical communication between said secondary bus and said control units, a vertical cable duct having closed vertical walls and openings at the top and bottom thereof, one of the walls of said cable duct adjoining a wall of each said housing, the adjoining walls of said cable duct and housings having small aligned openings for the passage of cable between each said housing and cable duct, and a flexible resilient grommet disposed in said aligned openings, said grommet having an annular channel embracing the walls of said housing and cable duct and a web in the central area thereof, said web being formed of a plurality of separate sectors tapering toward their apices, said sectors engageable with said cable to reduce the size of the openings in said walls.

4. An electrical distribution system comprising a horizontally extending bus duct having an opening only in the bottom thereof, at least one primary bus located in said duct, a vertically extending bus duct having closed vertical walls and an opening at the top thereof, said vertical duct being joined to said horizontal duct with said openings aligned, at least one secondary bus dropping from said primary bus and disposed in said vertical duct, at least one closed control unit housing secured to a wall of said vertical duct, a control unit in said housing, an electrical connector unit mounted in the adjoining wall of said housing and said vertical duct to provide electrical communication between said secondary bus and said control units, a vertical cable duct having closed vertical walls and an opening in at least one end thereof, one of the walls of said cable duct adjoining a wall of each said housing, the adjoining walls of said cable duct and housing having small aligned openings for the passage of cable between said housing and cable duct, means for sealing said openings around said cable, and at least one horizontal cable duct at the open end of said cable duct and having an opening communicating with said cable duct, said horizontal duct including walls forming barriers to isolate said horizontal duct from said bus ducts and from said control unit housing.

5. An electrical distribution system comprising a horizontally extending bus duct having an opening only in the bottom thereof, at least one primary bus located in said duct, a vertically extending bus duct having closed vertical walls and an opening at the top thereof, said vertical duct being joined to said horizontal duct with said openings aligned, at least one secondary bus dropping from said primary bus and disposed in said vertical duct, a plurality of closed control unit housings secured in vertical alignment to a wall of said vertical duct, control units in said housings, an electrical connector unit mounted in the adjoining walls of each said housing and said vertical duct to provide electrical communication between said secondary bus and said control units, a vertical cable duct having closed vertical walls, one of the walls of said cable duct adjoining a wall of each said housing, the adjoining walls of said cable duct and housing having openings for making electrical communication between each said housing and cable duct and means for sealing said openings.

References Cited in the file of this patent

UNITED STATES PATENTS

| Number | Name | Date |
|---|---|---|
| 913,024 | Meacham | Feb. 23, 1909 |
| 1,037,010 | Irons | Aug. 27, 1912 |
| 1,342,545 | Krantz | June 8, 1920 |
| 1,434,897 | Howell | Nov. 7, 1922 |
| 1,697,814 | Forbes | Jan. 1, 1929 |
| 1,857,711 | Dante | May 10, 1932 |
| 1,894,675 | Dixon | Jan. 17, 1933 |
| 1,955,287 | Graves | Apr. 17, 1934 |
| 1,956,439 | Frank | Apr. 24, 1934 |
| 2,041,675 | Frank | May 19, 1936 |
| 2,147,023 | Frank | Feb. 14, 1939 |
| 2,219,250 | Bramhall | Oct. 22, 1940 |
| 2,319,415 | Lightfoot | May 18, 1943 |
| 2,427,742 | Peterson | Sept. 23, 1947 |
| 2,542,853 | Wills | Feb. 20, 1951 |
| 2,619,515 | Doane | Nov. 25, 1952 |
| 2,648,032 | Mekelburg | Aug. 4, 1953 |
| 2,708,927 | Dixon | May 27, 1955 |
| 2,766,614 | Cook | Oct. 16, 1956 |
| 2,829,317 | Timmermans | Apr. 1, 1958 |
| 2,832,406 | Turenne | Apr. 29, 1958 |
| 2,859,390 | Baker | Nov. 4, 1958 |
| 2,891,101 | Koliss | June 16, 1959 |

UNITED STATES PATENT OFFICE
CERTIFICATE OF CORRECTION

Patent No. 3,003,084                                                    October 3, 1961

Weldon C. Wilkinson

It is hereby certified that error appears in the above numbered patent requiring correction and that the said Letters Patent should read as corrected below.

Column 7, line 15, for "veritcal" read -- secondary --; line 16, for "secondary" read -- vertical --.

Signed and sealed this 27th day of March 1962.

(SEAL)
Attest:

ERNEST W. SWIDER                                             DAVID L. LADD
Attesting Officer                                              Commissioner of Patents